United States Patent [19]
Meredith

[11] Patent Number: 5,928,510
[45] Date of Patent: Jul. 27, 1999

[54] FILTER APPARATUS FOR EVEN FLOW DISTRIBUTION

[75] Inventor: Jack O. Meredith, Lake Geneva, Wis.

[73] Assignee: Miller Brewing Company, Milwaukee, Wis.

[21] Appl. No.: 08/974,852

[22] Filed: Nov. 20, 1997

[51] Int. Cl.$^6$ .......................... B01D 39/20; B01D 35/027
[52] U.S. Cl. .......................... 210/232; 210/437; 210/457; 210/489; 210/497.01; 210/315; 210/510.1
[58] Field of Search .................... 210/232, 315, 210/457, 458, 510.1, 314, 342, 437, 489, 497.01

[56] References Cited

U.S. PATENT DOCUMENTS

| | | |
|---|---|---|
| 600,651 | 3/1898 | Roberts . |
| 619,341 | 2/1899 | Postlethwaite . |
| 2,905,326 | 9/1959 | Judson et al. ............................ 210/457 |
| 3,160,588 | 12/1964 | Alarie ...................................... 210/457 |
| 3,317,043 | 5/1967 | Vanderpoel ............................. 210/457 |
| 3,498,464 | 3/1970 | Frosolone ................................ 210/457 |
| 3,815,744 | 6/1974 | Vanderpoel ................................ 210/94 |
| 4,753,726 | 6/1988 | Suchanek ................................. 210/232 |
| 4,894,158 | 1/1990 | Morita et al. ......................... 210/497.2 |
| 4,986,900 | 1/1991 | Mason . |
| 5,088,554 | 2/1992 | Arterbury et al. . |
| 5,106,501 | 4/1992 | Yang et al. . |
| 5,403,480 | 4/1995 | Sugimoto ............................. 210/323.2 |
| 5,454,947 | 10/1995 | Olapinski et al. .................... 210/510.1 |
| 5,536,403 | 7/1996 | Sugimoto ................................ 210/256 |
| 5,587,071 | 12/1996 | Belden . |
| 5,650,073 | 7/1997 | Merrett . |
| 5,814,129 | 9/1998 | Tentarelli . |

*Primary Examiner*—Jay H. Woo
*Assistant Examiner*—Fred Prince
*Attorney, Agent, or Firm*—Quarles & Brady, LLP

[57] ABSTRACT

A filter system including a cylindrical filter formed around a cylindrical spindle so as to form a passage therebetween, the spindle forming a channel along its length, a channel outlet at a lower end and a plurality of inlet apertures which lead from the passage to the channel, the apertures unevenly distributed along the length of the spindle such that there is a greater combined aperture area in an upper portion of the spindle than there is in a lower portion of the spindle whereby essentially even fluid flow occurs through the filter.

15 Claims, 3 Drawing Sheets

FILTER APPARATUS FOR EVEN FLOW DISTRIBUTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to low pressure ceramic filter systems for liquid and more particularly to a low pressure beer filter system including a novel filter supporter which causes essentially even liquid flow through all parts of a ceramic filter.

There are several objective performance criteria by which to assess the value of a liquid filter system. One of the most important criteria is the speed with which a filter system can filter a representative liquid volume, speed being closely associated with filter efficiency. In order to expedite a filtering process, it is always desirable to design filters which have a large filter area and wherein the entire filter area is continually used during the filtering process.

One advantageous filter type includes a ceramic filter medium which is capable of removing extremely fine particles from a liquid. Ceramic filters are particularly advantageous in the beer industry where filters must be able to remove micro-bacteria and other fine particulates. Referring to FIG. 1, a typical ceramic filter system 8 includes a spindle 10 on which is mounted a cylindrical ceramic filter 12. Spindle 10 includes a solid bar 14 on the bottom of which extends an inverted cup member 16. An annular flange 18 extends radially outwardly from cup member 16. One or more (preferably three) large outlets 20 are provided in an upper portion of member 16 above flange 18. Filter 12 has upper upper 12b and lower 12a sections and rests on an upper surface of flange 18. A gasket (not shown) is provided between filter 12 and flange 18 so that liquid cannot pass therebetween. A sealing gasket 22 is provided at the top of filter 12. Thus, spindle 10 and filter 12 form a chamber 24 therebetween having outlet 20.

In operation, system 8 is placed inside a large vat of low pressure beer. Once chamber 24 is filled, as beer exits outlet 20, a "beer vacuum" occurs therein and an equal amount of beer is drawn through filter 12 into chamber 24.

One problem with system 8 has been uneven and therefore inefficient liquid flow through filter 12. Specifically, a greater relative flow passes through lower section 12a than through upper section 12b.

With chamber 24 filled, as beer exits outlet 20, the beer vacuum is primarily adjacent outlet 20 and lower filter section 12a. Thus, while some beer passing through outlet 20 is drawn from upper section 12b, a greater relative percentage per unit length is drawn from lower section 12a. Even as lower section 12a becomes clogged, because the vacuum is adjacent section 12a, the vacuum still draws an inordinate amount of beer through section 12a. Using clogged section 12a instead of section 12b is inefficient.

One filter flow spreading solution is to provide a pipe-like spindle which forms a plurality of outlets along its length. One such design, albeit used to filter high pressure liquid, is described in U.S. Pat. No. 600,651 which issued on Mar. 15, 1898. That design includes a pipe-like spindle which forms a plurality of apertures evenly distributed along its length. The high pressure causes fluid flow through all sections of the filter and through all spindle apertures.

Unfortunately, while this solution generates even flow in a high pressure environment, it has been found that this solution only generates an insubstantial amount of additional flow through the upper portion of a filter in a low pressure environment. As with the typical filter system described above which forms only a single outlet, it is believed that the flow characteristics observed at low pressure where there are a plurality of apertures result from the beer vacuum being concentrated at the lower end of the spindle adjacent the lower most apertures. In this case there is relatively greater flow through the lower apertures than through the upper apertures.

Therefore, it would be advantageous to have a filter system for removing impurities from low pressure liquid wherein the system causes essentially even flow through all filter sections thereby increasing filter flow rate.

BRIEF SUMMARY OF THE INVENTION

The present invention includes a spindle supporter for supporting a ceramic filter within a container of low pressure liquid which facilitates even fluid flow through all parts of the filter. To this end, the spindle is pipe-like forming a channel which extends essentially along, and a plurality of apertures which are unevenly distributed along, the spindle length. More specifically, uneven aperture distribution is chosen such that there is greater aperture area in an upper half of the spindle than in a lower half thereby resulting in essentially even flow through the filter.

The invention includes a filter apparatus for removing impurities from an unpressurized fluid within a container, the container forming a container opening. The apparatus includes a supporter including a conduit having upper and lower halves and external and internal surfaces, the internal surface forming a channel which extends essentially from an upper conduit end to a lower conduit end, the conduit forming a plurality of inlet apertures along its length, each aperture having a cross sectional area. Combined aperture areas in the upper half comprise an upper area and the combined aperture areas in the lower half comprise a lower area. The upper area is greater than the lower area. The lower end forms a channel outlet. The system also includes a filter member formed around the conduit, a member bottom end closed to the lower conduit end. The supporter is positionable within the container with its upper half above its lower half and the outlet linked to the container opening. Preferably the filter member is a ceramic filter. Preferably the upper area is at least ten percent greater than the lower area and most preferably the upper area is approximately twice as large as the lower area.

In one aspect the member includes an inner surface which is spaced apart from the external surface such that the inner and external surfaces together form a passage essentially along the entire conduit length.

A primary object of the invention is to provide a low pressure filter system wherein flow through a ceramic filter member is essentially even along an entire filter length. To this end, the inventive spindle includes apertures which unevenly distribute aperture cross-sectional area along the member length. Specifically, the apertures provide additional cross sectional area along the upper half of the spindle. By distributing the cross-sectional area unevenly beer vacuum effect at the top of the spindle is increased substantially thereby causing additional flow therethrough.

Another object of the invention is to ensure that there is even liquid distribution adjacent the external surface. To this end, a passageway is provided between the inner and external surfaces to facilitate equilibrium.

In another aspect the conduit includes a top section, a middle section and a bottom section, the combined aperture areas in the top section being a top area, the combined aperture areas in the middle section being a middle area and the combined aperture areas in the bottom section being a bottom area. Here, the top area is greater than the middle area and the middle area is greater than the bottom area. Preferably the combined aperture areas along the entire conduit form a total area and the top area is essentially one half the total area, the middle area is essentially one third the total area and the bottom area is essentially one sixth the total area.

Fast flow rate is an object of the invention. It has been found through experimentation that filter member flow rate can essentially be optimized by dividing the conduit length into thirds and providing approximately half of the total aperture cross sectional area in the top third, one third of the total area in the middle third and one sixth of the total area in the bottom third.

In another aspect where the combined aperture areas along the entire conduit form a total area and the outlet defines a cross sectional outlet area, a minimum cross sectional area formed by the internal surface is at least as large as the outlet area and the total area is at least as large as the outlet area. In addition, the total area is equal to the outlet area plus an additional area to account for frictional losses as liquid passes through the apertures. Preferably, the lower area is less than the outlet area.

Another object is to ensure proportionate flow through the upper filter sections. To this end, if the lower area is less than the outlet area, flow in addition to flow passing through the lower area is drawn from the upper filter section. In effect, the beer vacuum is distributed along the length of the filter.

In another aspect the supporter includes an annular flange which extends radially outwardly from the lower end and the filter is supported on and sealed against the flange. In one other aspect a roof member traverses the area between the conduit upper end and a top end of the filter member thereby closing a top passage end.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Figure 1:
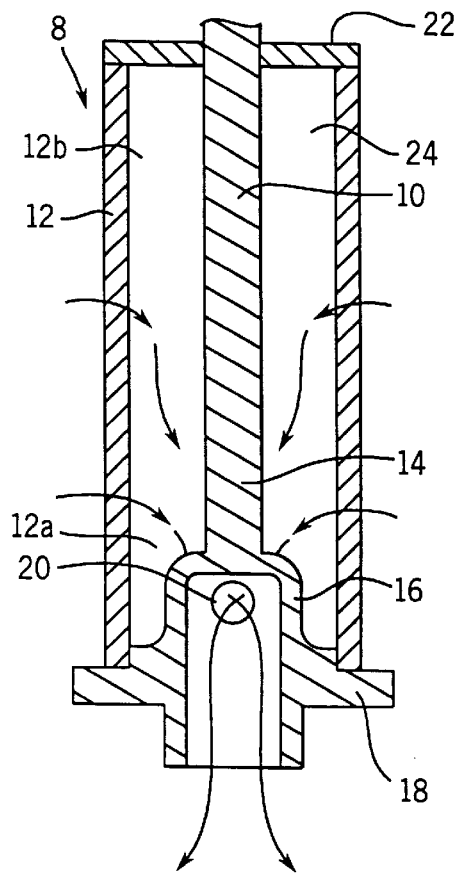
FIG. 1 illustrates a prior art ceramic filter system.
Figure 2:
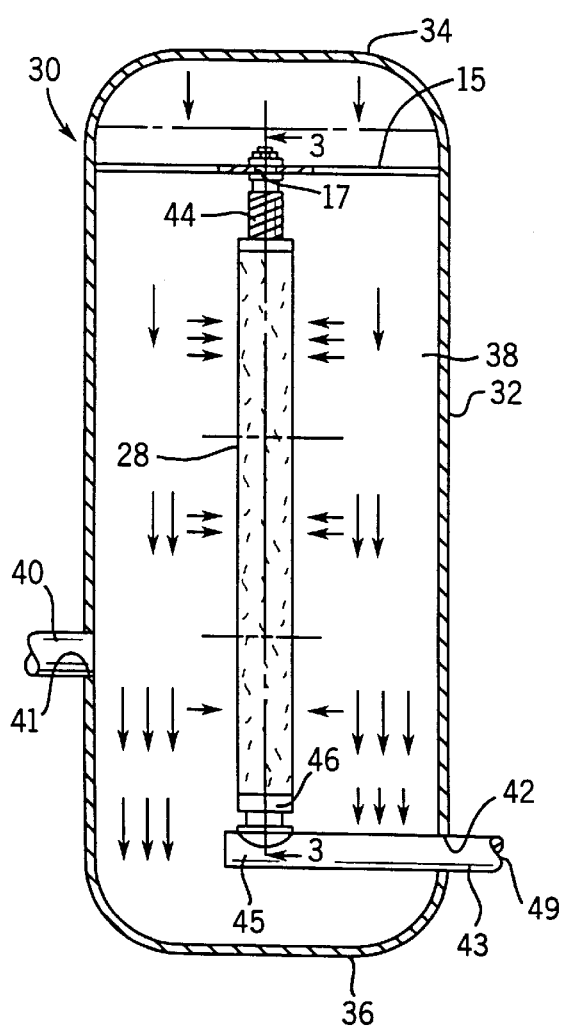
FIG. 2 is a side elevational view of a filter system according to the present invention installed in a reservoir.

Referring now to the drawings, wherein like reference characters represent corresponding elements throughout the several views, and more specifically referring to FIG. 2, the inventive spindle configuration will be described in the context of an exemplary filter assembly 28 which forms a part of a fluid filtering system 30. System 30 includes a fluid reservoir 32 having a ceiling wall 34 and a floor wall 36. Reservoir 32 forms a fluid chamber 38 therein. An inlet conduit 40 directs fluid to be filtered through an inlet 41 into chamber 38 essentially maintaining chamber 38 full at all times during a filtering process. An outlet 42 is formed below inlet 40 and an outlet conduit 43 extends through outlet 42, an internal end 45 located within chamber 38 and an external end 49 located outside chamber 38. A lattice member 15 is integrally secured below wall 34 and forms a centrally located aperture 17.

Filter assembly 28 is cylindrical and essentially traverses the distance between ceiling and floor walls 34, 36, respectively. An upper end 44 of assembly 28 is configured so that it extends through and is secured within aperture 17 in a manner which will be described in more detail below. A lower end 46 of assembly 28 is secured to and forms a liquid tight seal with, the internal end 45 of outlet conduit 43.

Figure 3:
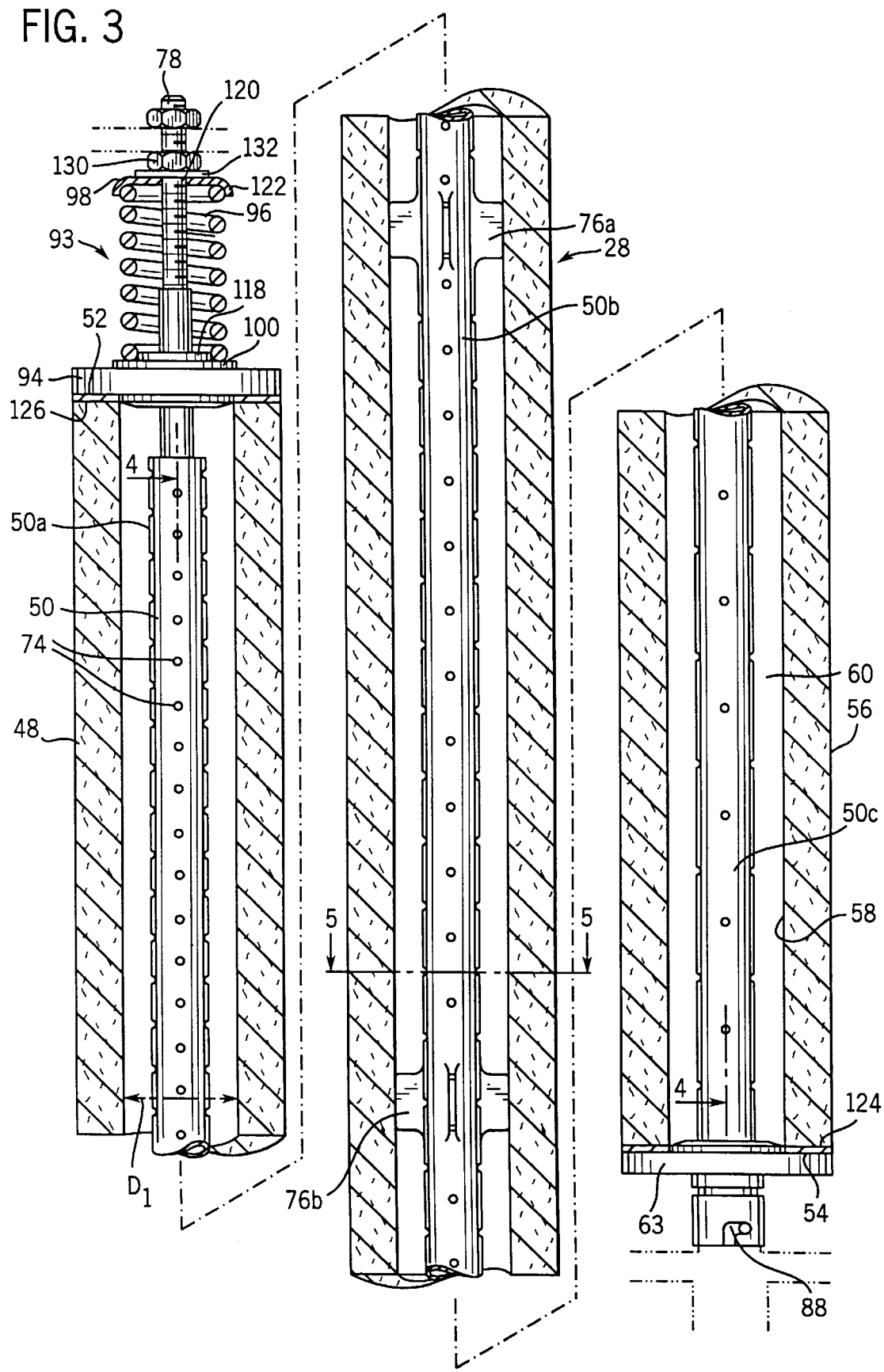
FIG. 3 is a partial cross-sectional view taken along the line 3—3 in FIG. 2.
Figure 4:
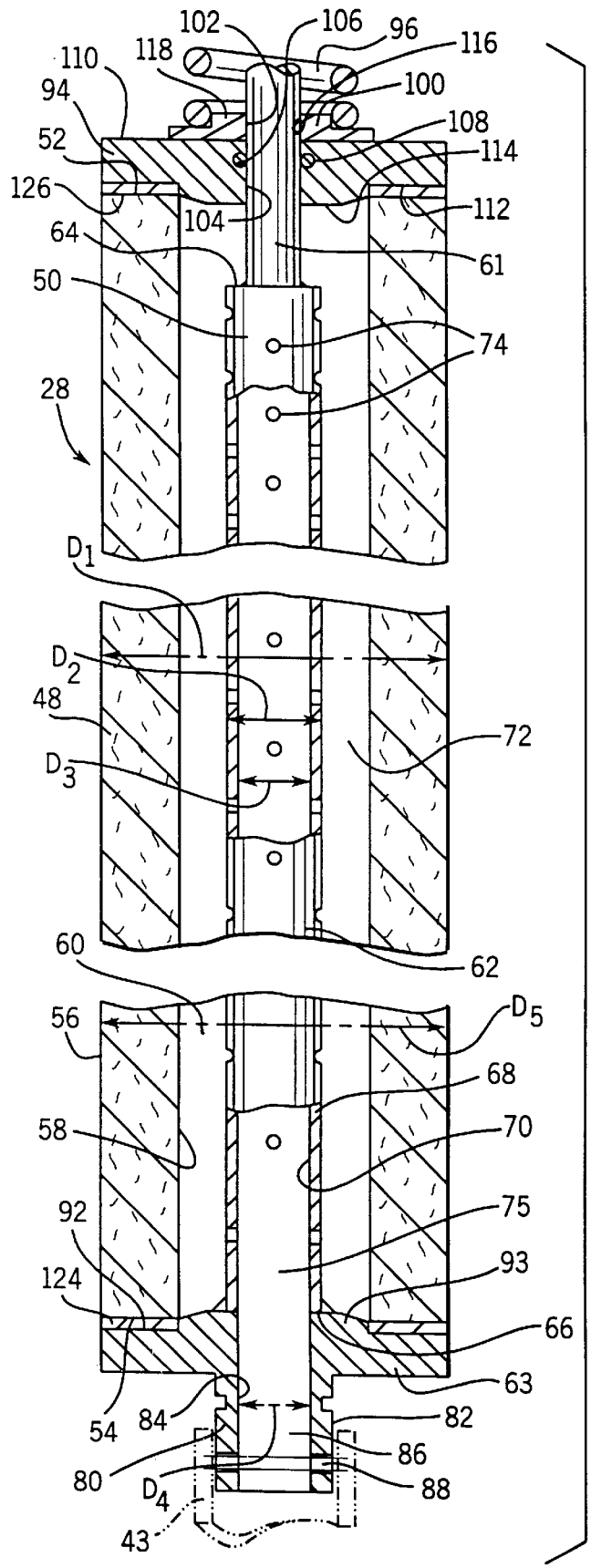
FIG. 4 is a partial cross-sectional view taken along the line 4—4 in FIG. 3.
Figure 5:
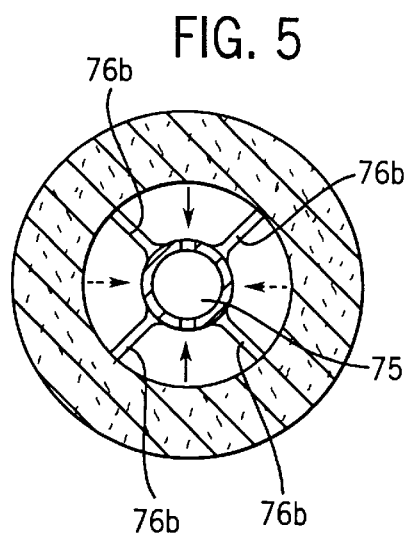
FIG. 5 is a cross-sectional view taken along line 5—5 in FIG. 3.

Referring also to FIGS. 3, 4 and 5, assembly 28 includes a filter member 48, a supporter or spindle member 50 and various other components and assemblies used to secure member 48 to spindle member 50 and to secure assembly 28 within reservoir 32.

Filter member 48 consists of one or more ceramic cylinders. Member 48 has a top end 52, a bottom end 54, an outer surface 56 and an inner surface 58 which defines a filter chamber 60 therein. Inner surface 58 defines a diameter $D_1$ along it entire length while outer surface 56 defines a diameter $D_5$.

Spindle member 50 includes a conduit section 62 welded to first and second axial members 61, 63 at upper and lower ends 64, 66, respectively. Conduit 62 is cylindrical and elongated and is defined by an external surface 68 and an internal surface 70. A diameter $D_2$ defined by external surface 68 is substantially less than (e.g. approximately half) diameter $D_1$ formed by inner surface 58. Inner surface 58 and external surface 68 form a passageway 72 essentially along the entire conduit length. Internal surface 70 defines a diameter $D_3$.

Referring now to FIGS. 3 and 5, two sets of lateral extensions 76a and 76b extend radially outwardly from external surface 68. Each set of extensions 76a and 76b includes four separate narrow extensions which are equispaced about conduit 62. Each extension extends radially outwardly a distance equal to one-half the difference between diameter $D_1$ and diameter $D_2$ such that when member 50 is placed inside member 48, each extension extends to inner surface 58 limiting lateral movement of member 50 within channel 60. In addition, lateral extension sets 76a and 76b are equispaced along the length the member 50 such that sets 76a and 76b divide the length of member 50 into three separate sections. The three sections include a top section 50a, a middle section 50b and a bottom section 50c.

Conduit 62 forms a plurality of inlet apertures 74 along its length. All apertures 74 in the preferred embodiment have identical cross-sectional areas.

According to the present invention there are different numbers of apertures 74 in each of sections 50a, 50b and 50c. Generally, top section 50a has more apertures 74 than middle section 50b and middle section 50b has more apertures than bottom section 50c. In a preferred embodiment, where the cross-sectional areas of the apertures 74 are identical, half of the total number of apertures along the entire length of conduit 62 should be formed in the top section 50a, one-third of the total apertures should be formed in the middle section 50b and one-sixth of the total apertures should be formed in the bottom section 50c. In other words, where the combined cross-sectional areas of all apertures is a total area, the combined cross-sectional area of all apertures in the top section is a top area, the combined cross-sectional areas in the middle section is a middle area, the combined cross-sectional area of all apertures in the bottom section is a bottom area, the top area is approximately one-half the total area, the middle area is approximately one-third the total area and the bottom area is approximately one-sixth the total area.

Referring still to FIGS. 3 and 4, member 61 is welded to upper end 64 extending axially therefrom. Member 61 is solid, cylindrical and threaded at a distal end 78.

Member 63 is welded to lower end 66 extending axially and radially from the welding joint. Member 63 extends axially forming an outlet duct 80 having an external surface 82 and an internal surface 84. Surface 84 forms an outlet channel 86 having a diameter $D_4$ identical to diameter $D_3$. Surface 82 forms a keyed recess 88 for securing outlet conduit 43 in any manner known in the art. Member 63 extends radially forming a flange 90 having an upper sealing surface 92 and a diameter which is preferably identical to diameter $D_5$. Surface 92 forms a central raised portion 93 which helps position member 48 about spindle member 50 during assembly.

An assembly 93 for securing end 44 within aperture 40 and for securing filter member 48 about spindle member 50 includes a roof member 94, a spring 96, a spring receiver plate 98, a washer 100 and various other components. Member 94 includes a circular disc having a diameter which is preferably identical to the diameter $D_5$. Member 94 includes an inner surface 104 which forms a central aperture 102. Aperture 102 is slightly wider than member 61 so that member 61 can be passed therethrough. Surface 104 forms a circumferential recess 106 for receiving an elastomeric O-ring 108 which, when assembly 28 is assembled, seals against member 61. Member 94 also includes an upper surface 110 and a lower sealing surface 112. Lower sealing surface 112, like surface 92, includes a central raised portion 114 which helps position filter member 48 with respect to member 50 during assembly.

Spring 96 is a typical helical spring. Washer 100 is circular, has a diameter less than the diameter of member 94, forms a central aperture 116 having a diameter similar to the diameter of aperture 104 and forms a central raised portion 118 sized to be received within an end of spring 96.

Referring to FIG. 3, receiver plate 98 is circular, has a diameter slightly larger than the diameter of spring 96, forms a central aperture 120 for passing the threaded portion of member 61 and forms a flange 122 which extends axially from a distal edge, an end of spring 96 receivable within flange 122.

The cross-sectional areas defined by channel 75 and outlet channel 86 are preferably identical and have a special relationship to the areas of apertures 74 thereabove. In particular, the channel cross-sectional area is greater than the bottom area such that at least some flow must occur through the middle and top sections 50a and 50b to fill the channel. This ensures at least some beer vacuum within sections 50a and 50b. In addition, most preferably, the channel cross-sectional area is greater than the bottom and middle areas combined ensuring at least some beer vacuum in the top section. All cross-sectional areas have to be adjusted (i.e. enlarged) to compensate for frictional losses associated with liquid passing through apertures.

To assemble assembly 28, with members 61 and 63 welded to conduit 62, a gasket 124 is placed on surface 92 around raised portion 93. Member 61 and conduit 62 are fed through filter member 48 until end 54 rests on gasket 124. While member 61 and conduit 62 are fed through member 48, extension sets 76a and 76b maintain passageway 72 between surfaces 58 and 68. With end 54 resting on gasket 124, member 61 extends centrally and axially from end 52.

A gasket 126 is placed on end 52. O-ring 108 is placed inside recess 106 and member 61 is fed through aperture 102 until sealing surface 112 rests on gasket 126. O-ring 108 seals against member 61. Next, member 61 is fed through washer aperture 116 so that washer 100 rests on surface 110 with raised portion 118 facing upwardly. Member 61 is fed through spring 96 and plate aperture 120 such that portion 118 is received in one end of spring 96 and the other end of spring 96 is received within flange 122. A nut and washer 130, 132, respectively, receive threaded distal end 78 and are tightened thereon so that spring 96 biases washer 100, member 94, gasket 126, filter member 48 and gasket 124 against surface 92. Nut 130 should be tightened until gaskets 124 and 126 form liquid tight seals.

With assembly 28 assembled, assembly 28 is positioned inside a reservoir 22 for filtering fluid therein. To this end, referring to FIGS. 2 and 3, with nut 130 tightened to a point where distal end 78 extends therefrom, end 78 is fed through lattice aperture 17 and assembly 28 is suspended within reservoir 32 by securing a second nut 134 on end 78.

Next, outlet conduit 43 is attached to outlet duct 80 for transporting filtered liquid from reservoir 32 to a holding tank (not illustrated). Conduit 43 extends through and should be sealed against aperture 42 in any manner well known in the art.

In operation, with assembly 28 suspended in liquid filled reservoir 32, liquid passes through filter member 50 and into passageway 72. Liquid in passageway 72 flow through apertures 74 into channel 75, from channel 75 through outlet channel 76 and thereby into outlet conduit 43 to a holding tank.

Because there are relatively more apertures 74 in top section 50a than in middle and lower sections 50b and 50c, there is a greater tendency for beer flowing out of duct 80 to form a beer vacuum in top section 50a than in the other two sections 50b and 50c. Similarly, because there are relatively more apertures 74 in section 50b than in section 50c, there is a greater tendency for a beer vacuum to form in middle section 50b than in lower section 50c. Nevertheless, because a single aperture 74 near the bottom of conduit 62 will have a greater vacuum creating effect than an identical aperture 74 near the top, by choosing the numbers of apertures in each of the top, middle and lower sections 50a, 50b and 50c carefully, an essentially even vacuum can be generated along the entire length of conduit 62 thereby causing more even liquid flow through filter member 48. As indicated above, experiments have shown that preferred aperture distribution includes distribution wherein approximately one-half of all aperture area is in a top third of the spindle, one-third is in a middle third and one-sixth is in the bottom third.

It should be understood that the apparatus described above is only exemplary and does not limit the scope of the invention, and that various modifications could be made by those skilled in the art that would fall under the scope of the invention. For example, while the apparatus above is described as including a single filter member 48, clearly, a plurality (e.g. three) cylindrical filter members could be positioned in series along the length of member 50 with suitable gaskets therebetween. In addition, while the preferred embodiment includes apertures 74 each of which have identical cross-sectional areas, apertures 74 need not have identical cross-sectional areas. To this end, apertures in top section 50*a* could have cross-sectional areas which are much larger than the cross-sectional areas of apertures in the middle and bottom sections 50*b*, 50*c*, respectively. On the other hand, there may be several sized apertures in any one of the top, middle or bottom sections. The important aspect of the present invention with respect to cross-sectional area of apertures is that there be a relatively larger total cross-sectional area provided in an upper section of member 50 when compared to a lower section. In fact, to this end, the invention is meant to include other configurations wherein the cross-sectional area of apertures in a top half of member 50 is greater than the total cross-sectional area of apertures in the lower half.

Moreover, the invention is meant to include other configurations which have different types of connecting assemblies for connecting assembly 28 within a reservoir 32. Furthermore, the invention may be used with a plurality of filter assemblies 28 arranged in parallel within a reservoir 32 and may be used with other than ceramic filters in a low pressure environment.

To apprise the public of the scope of this invention, we make the following claims:

I claim:

1. A filter apparatus for removing impurities from an unpressurized fluid within a container, the container forming a container opening, the apparatus comprising:

a supporter including a conduit having upper and lower halves and external and internal surfaces, the internal surface forming a channel which extends essentially from an upper conduit end to a lower conduit end, the conduit forming a plurality of inlet apertures along its length, each aperture having a cross sectional area, the combined aperture areas in the upper half being an upper area and the combined aperture areas in the lower half being a lower area, the upper area greater than the lower area, the lower end forming a channel outlet; and a filter member formed around the conduit, a member bottom end closed to the lower conduit end, the filter member includes an inner surface which is spaced apart from the external surface such that the inner and external surfaces together form a passage essentially along the entire conduit length;

whereby, the supporter is positionable within the container with its upper half above its lower half and the outlet linked to the container opening.

2. The apparatus of claim 1 wherein the upper area is at least ten percent greater than the lower area.

3. The apparatus of claim 2 wherein the upper area is essentially twice as large as the lower area.

4. The apparatus of claim 1 wherein the conduit includes a top section, a middle section and a bottom section, the combined aperture areas in the top section being a top area, the combined aperture areas in the middle section being a middle area and the combined aperture areas in the bottom section being a bottom area, the top area greater than the middle area and the middle area greater than the bottom area.

5. The apparatus of claim 4 wherein the top area is at least ten percent and twenty percent greater than the middle and bottom areas, respectively.

6. The apparatus of claim 5 wherein the combined aperture areas along the entire conduit form a total area and the top area is essentially one half the total area, the middle area is essentially one third the total area and the bottom area is essentially one sixth the total area.

7. The apparatus of claim 1 wherein the combined aperture areas along the entire conduit form a total area, the outlet defines a cross sectional outlet area, a minimum cross sectional area formed by the internal surface is at least as large as the outlet area and the total area is at least as large as the outlet area.

8. The apparatus of claim 7 wherein the total area is equal to the outlet area plus an additional area to account for frictional losses as liquid passes through the apertures.

9. The apparatus of claim 7 wherein the lower area is less than the outlet area.

10. The apparatus of claim 1 wherein the external surface is cylindrical having a first diameter and the internal surface is cylindrical having a second diameter.

11. The apparatus of claim 1 wherein the member is a cylindrical ceramic filter.

12. The apparatus of claim 11 wherein the supporter includes an annular flange which extends radially outwardly from the lower end and the filter is supported on and sealed against the flange.

13. The apparatus of claim 12 further including a roof member traversing the area between the conduit upper end and a top end of the filter member thereby closing a top passage end.

14. The apparatus of claim 1 further including a suspender linked to the supporter for suspending the supporter and member within the container.

15. The apparatus of claim 1 wherein each aperture area is essentially identical.

* * * * *